(12) United States Patent
Doi et al.

(10) Patent No.: US 7,866,612 B2
(45) Date of Patent: Jan. 11, 2011

(54) CLAMP FOR USE IN WIRE HARNESS

(75) Inventors: Masayuki Doi, Yokkaichi (JP);
Toshitsugu Morii, Yokkaichi (JP);
Shigeru Oyamada, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 458 days.

(21) Appl. No.: 11/975,943

(22) Filed: Oct. 23, 2007

(65) Prior Publication Data
US 2008/0093521 A1    Apr. 24, 2008

(30) Foreign Application Priority Data

Oct. 23, 2006 (JP) .............................. 2006-287664
Oct. 23, 2006 (JP) .............................. 2006-287691

(51) Int. Cl.
*F16B 15/00* (2006.01)
(52) U.S. Cl. .................. 248/71; 248/67.5; 248/67.7
(58) Field of Classification Search .................. 248/65, 248/67.5, 67.7, 58, 71
See application file for complete search history.

(56) References Cited

U.S. PATENT DOCUMENTS

| | | | |
|---|---|---|---|
| 5,131,613 A | | 7/1992 | Kamiya et al. |
| 5,601,261 A | * | 2/1997 | Koike ............................ 248/71 |
| 6,749,157 B2 | * | 6/2004 | Takeuchi ....................... 248/71 |
| 6,809,257 B2 | * | 10/2004 | Shibuya ....................... 174/481 |
| 7,045,715 B2 | * | 5/2006 | Ono ........................... 174/72 A |
| 7,201,352 B2 | * | 4/2007 | Kawai ........................ 248/74.1 |
| 7,661,633 B2 | * | 2/2010 | Igarashi et al. .............. 248/74.3 |
| 2001/0054671 A1 | * | 12/2001 | Kondo ........................ 248/74.3 |

FOREIGN PATENT DOCUMENTS

JP     11-234869     8/1999

\* cited by examiner

*Primary Examiner*—Terrell Mckinnon
*Assistant Examiner*—Steven M Marsh
(74) *Attorney, Agent, or Firm*—Gerald E. Hespos; Michael J. Porco

(57) ABSTRACT

A clamp (10) has a plate (12) with a harness-mounting part (11) to be fastened to a wire harness. Two spaced-apart stems (14) project from the plate (12). A spanning part (14) connects confronting portions of the stems (15) to form a cavity (18). A vane support (17) projects out from the end of each stem (15) and a vane (16) projects down and out from a tip of each vane support (17). A vehicle body-locking part (16a) formed at a tip of each vane (16). The spanning part (14) twists towards the cavity (18) when the wire harness is pulled in a withdrawal direction from the vehicle body to unlock the vehicle body-locking parts (16a) of the vanes (16) from the locking hole.

16 Claims, 22 Drawing Sheets

CLAMP FOR USE IN WIRE HARNESS

BACKGROUND OF THE INVENTION

1. Field of the Invention

The invention relates to a clamp for use in a wire harness and more particularly to a clamp for use in a wire harness which allows the wire harness to be removed easily from a vehicle body for replacing the wire harness wired thereon and disassembling the vehicle body.

2. Description of the Related Art

Substrate-type clamps and band-type clamps have been proposed for fixing a wire harness to a vehicle body. FIGS. 23A-23C herein show a substrate-type clamp that has a substrate 2 and a clamping part 3 formed integrally of synthetic resin. The clamping part 3 has a vane 3a and a locking step 3b is formed at the tip of the vane 3a. The substrate 2 is mounted on the periphery of a wire harness W/H with a tape T and the vane 3a of the clamping part 3 is inserted into a locking hole 4a of a vehicle body 4. Thus, the locking step 3b of the vane 3a is locked securely to the peripheral edge of the locking hole 4a at the back side of the vehicle body 4. Accordingly, the wire harness W/H is locked and fixed to the vehicle body 4 with a large force.

A band-type clamp has a band-fastener with a clamping part. A vane is formed on the clamping part and a locking step is formed on the vane. The vane is locked to the locking hole of the vehicle body to fix the wire harness to the vehicle body in a manner similar to the substrate-type clamp.

The wire harness may have to be replaced in a manufacturing process and may have to be exchanged when the wire harness has trouble during use. Additionally, there are increasing demands to design vehicles for easy disassembly so that parts of a vehicle can be reused or recycled when all or part of the vehicle has reached the end of its useful life.

For the above-described reasons, the wire harness must be mounted securely on the vehicle body during normal usage by providing secure locking forces between the clamping part and the vehicle body. However, the clamping part also must be capable of easy removal from the vehicle body when necessary.

Various clamps have been proposed for easy removal from the vehicle body. For example, Japanese Patent Application Laid-Open No. 234869 and FIG. 24 herein show a clamp with a substrate 80 for mounting on the wire harness W/H. A concave part 81 is open at the tip of an axial projection from the substrate 80. Vanes 82 project from both sides of the concave part 81 and a locking step 86 is formed on each vane 82. A pulling cord 84 is connected to both sides of the concave part 81 and can be pulled away from the vehicle body 85. As a result, both sides of the concave part 81 flex towards one another, and the vanes 82 flex inward to unlock the locking step 86 from the locking hole of the vehicle body.

The clamp shown in Japanese Patent Application Laid-Open No. 234869 and FIG. 24 requires the pulling cord. Thus there is an increase in the number of parts. Additionally, the pulling force is applied only to the concave part, and hence a large force is required to unlock the clamp from the locking hole. Thus it is difficult to disassemble the vehicle body. Such being the case, the clamp disclosed in Japanese Patent Application Laid-Open No. 234869 has room for improvement.

The invention has been made in view of the above-described problem. Accordingly, it is an object of the invention to provide a clamp for use in a wire harness capable of decreasing a pulling force for removing the wire harness from a vehicle body.

SUMMARY OF THE INVENTION

The invention relates to a clamp molded from resin and intended to be locked to a locking hole formed on a vehicle body while the clamp is mounted on a wire harness. Thus, the clamp enables the wire harness to be mounted on the vehicle body. The clamp includes a harness-mounting part that has a band and a band fastener. The band is configured to wrap around the wire harness, and an end of the band can be inserted in and locked to the band fastener. A plate projects from the band-fastener and two stems project from spaced apart pedestals on the plate. The stems preferably are shifted from each other longitudinally and are configured point symmetrically. A spanning part connects confronting areas of the stems at locations spaced from the plate. Vane supports project away from one another from the tip of each of the stems. The vane supports may be thicker than the spanning part. Two vanes project from the vane supports obliquely towards the plate and a vehicle body-locking step is formed at a tip of each vane.

The stems and the vanes can be inserted into a locking hole in a vehicle body so that the vehicle body-locking steps lock to opposed portions of a peripheral edge of the locking hole. If necessary, the wire harness can be pulled in a removal direction from the vehicle body. As a result, the spanning part twists and flexes towards the plate to unlock the vehicle body-locking steps of the vanes from the locking hole.

In the above-described construction, a cavity is formed by the stems and the spanning part. The spanning part may extend between tips of the stems, and hence may be between the two vane supports. In this manner, flexing can be generated easily by adjusting the thickness of the spanning part and the vane supports.

A load concentrates on the thin spanning part and the stems when the wire harness is pulled in a removal direction from the vehicle body. Thus, it is possible to flex the stems and the spanning part into the cavity and to incline the vanes sufficiently to unlock from the locking hole of the vehicle body. The vane supports may be thicker than the spanning part and may project stepwise at opposite ends of the spanning part. Therefore the thin spanning part flexes easily into the cavity about the steps at the ends of the spanning part and the thick vane supports that serve as the supports.

The stems preferably are shifted to dispose the stems symmetrically with respect to the point. For example, the first stem, the first vane support and the first vane may be symmetrical about a first plane, and the second stem, the second vane support and the second vane may be symmetrical about a second plane that preferably is parallel to but offset from the first plane. The point of symmetry may be centrally between the two hypothetical planes. Thus, the vanes supports and the vanes torsionally rotate about the central point of symmetry when the clamp is pulled in the removal direction, and the vehicle body-locking step of each vane is moved sufficiently to be unlocked from the periphery of the locking hole. As a result, the clamp is unlocked from the vehicle body. The wire harness can be pulled further in this state to take the vanes of the clamp out of the locking hole.

As described above, merely pulling the wire harness away from the vehicle body flexes the stems and the spanning part in the wire harness removal direction and also flexes the vanes in the torsional direction. Therefore it is possible to decrease the pull-out force for unlocking the vehicle body-locking step of the vane from the locking hole of the vehicle body.

The spanning part could break as the vanes flex progressively in the torsional direction. However, the stems are not supported by the broken spanning part, and can be flex more.

Thus, it is possible to decrease the pulling force for removing the wire harness from the vehicle body when the spanning part breaks.

The clamp may be removed from the vehicle body by breaking the spanning part, as described above. However, the clamp can be taken out from the locking hole when the spanning part if the vane twists sufficiently for the vehicle body-locking step to be unlocked from the locking hole even though the spanning part does not break. In this case, the clamp can be re-utilized.

The thickness of each of the stems preferably is small and equal to the thickness of the spanning part. Additionally, the stems are flexible so that the spanning part flexes easily in a shape of V into the cavity surrounded by the left and right stems, the spanning part, and the plate.

The above-described construction allows the left and right vanes to flex more and enables the clamp to be unlocked from the vehicle body by a low pull-out force. Thus, the wire harness can be removed easily from the vehicle body.

On the other hand, the provision of two stems enables the vanes to hold the vehicle body with a sufficient locking force even though each of the stems is thin. The spanning part is between the two stems and resists flexing of the stems when the wire harness is locked to the vehicle body. Further the tip of each vane preferably has a multi-step vehicle body-lock. After the clamp is locked to the vehicle body, a desired step of the vehicle body-lock of the vane can be locked securely to the periphery of the locking hole. Therefore, the wire harness is fixed reliably to the vehicle body and will not be loosened by vibration of the vehicle body.

The spanning part may have at least one groove. Additionally, the vane supports may have substantially the same thickness as the spanning part. The groove serves as the support for twist so that the vanes flex and twist about the groove. Thus when the wire harness is pulled in the removal direction from the vehicle body, a stress concentrates on the groove as the support for twist. Thus, the stems flex in and towards one another. Further, the stems are shifted from each other to project in a point symmetry, and the vanes rotate torsionally about the groove. Therefore it is possible to decrease the pulling force to unlock the vehicle body-locking steps of the vanes from the locking hole of the vehicle body. Rotation of the vanes causes the locking steps at the tips of the vanes to move in a direction to unlock from the peripheral edge of the locking hole. Thus, the clamp is unlocked from the vehicle body and the wire harness can be pulled so that the vanes of the clamp can be taken out of the locking hole.

The groove in the spanning part preferably has a depth of about ½ of the thickness of the spanning part. The spanning part is likely to be weak and is liable to break if the depth of the groove is significantly more than about ½ the thickness of the spanning part. On the other hand, the stems and the vanes are difficult to flex and twist if the depth of the groove is significantly less than ½ the thickness of the spanning part.

The groove may be formed on the inner surface of the spanning part that faces the plate or the outer surface thereof. Plural grooves may be provided in the spanning part.

A pedestal may be formed on a surface of each of the left and right stems opposite to confronting surfaces of the stems. Outer surface of each of the left and right pedestals may be opposed to inner surfaces of the left and right vanes. The pedestals are reinforcements and prevent the clamp for from rotating during insertion into the locking hole of the vehicle body or during removal from the vehicle body.

The pedestal may define a V-shaped groove between the stems. Additionally, the spanning part may be at ends of the stems substantially adjacent the pedestals. The spanning part may have a V-shaped groove substantially registered with the V-shaped groove in the pedestal. A pulling force on the wire harness in the removal direction from the vehicle body will cause the vanes to rotate torsionally about the groove in the spanning part so that the vehicle body-locking part of each vane is unlocked from the locking hole.

The stem and the vane support may have substantially equal cross-sectional dimension. The force required to pull the clamp from the mounting hole can be adjusted by altering the thickness of the stem and the vane support. That is, when the thickness of the stem and the vane support are large, a large pulling force is required to flex the stem and the vane part. On the other hand, when the thickness of the stem and the vane support are small, a small pulling force is required to remove the clamp from the vehicle body.

As described above, a mere pulling force on the wire harness in removal direction from the vehicle body torsionally rotates the stems and the vanes of the clamp and flexes the stems and the vanes inward. Therefore it is possible to remove the wire harness from the vehicle body at a low pull-out force.

DETAILED DESCRIPTION OF THE PREFERRED EMBODIMENTS

Figure 1:
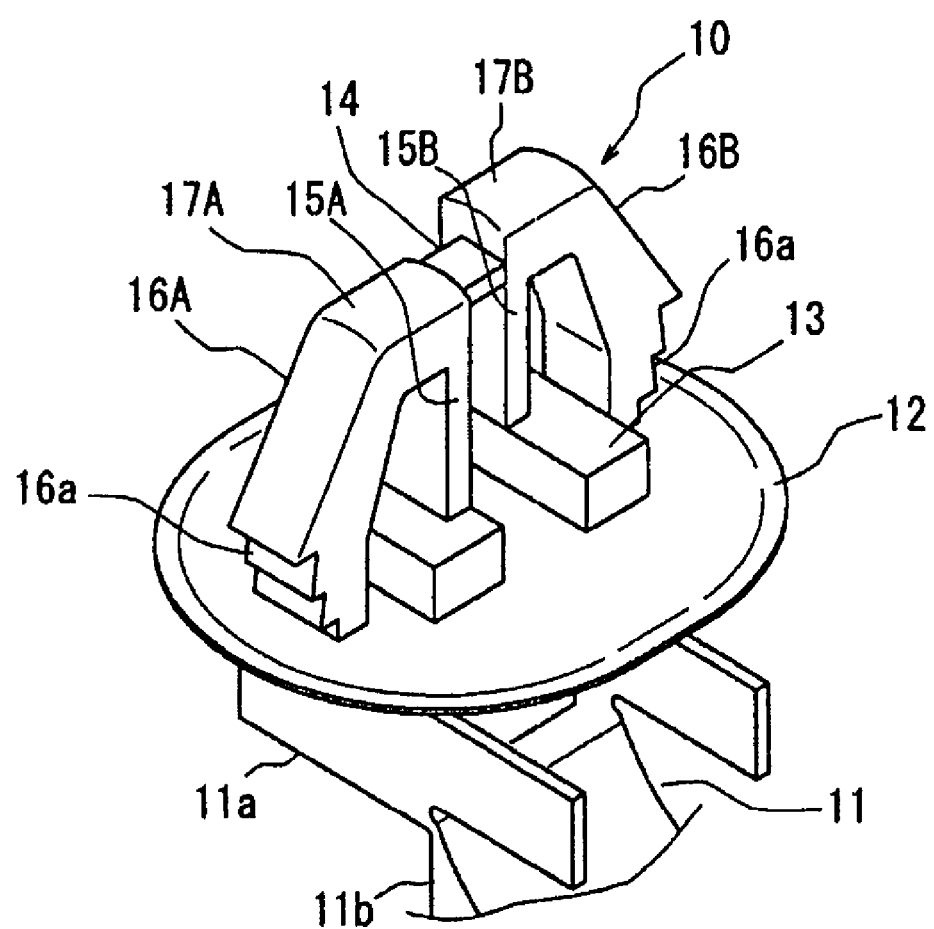
FIG. 1 is a perspective view showing a clamp for use in a wire harness of a first embodiment of the present invention.
Figure 2:
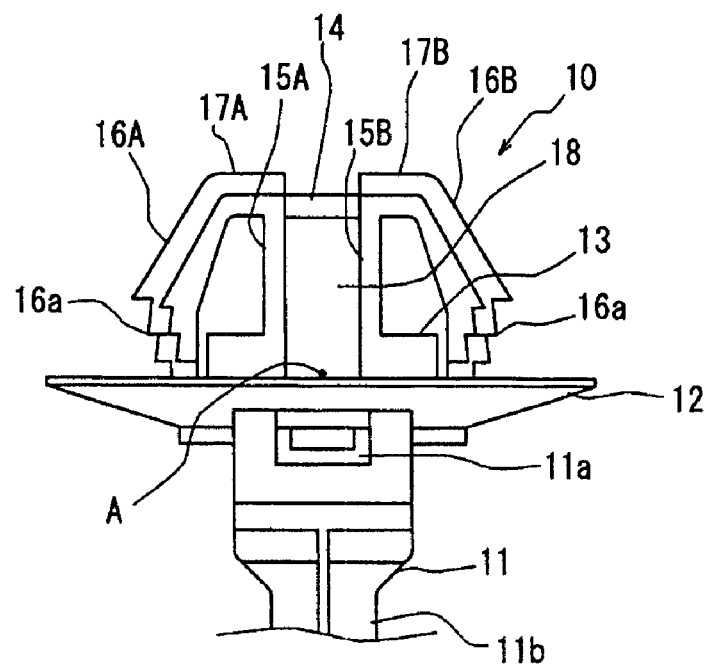
FIG. 2 is a front view of the clamp for use in the wire harness.
Figure 3:
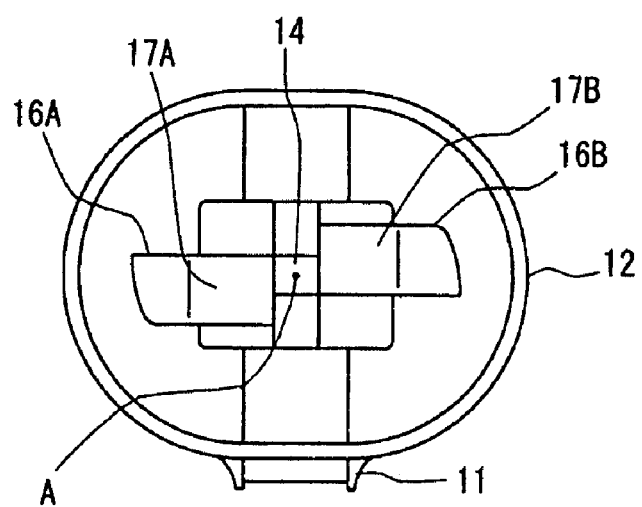
FIG. 3 is a plan view of the clamp for use in the wire harness.
Figure 4:
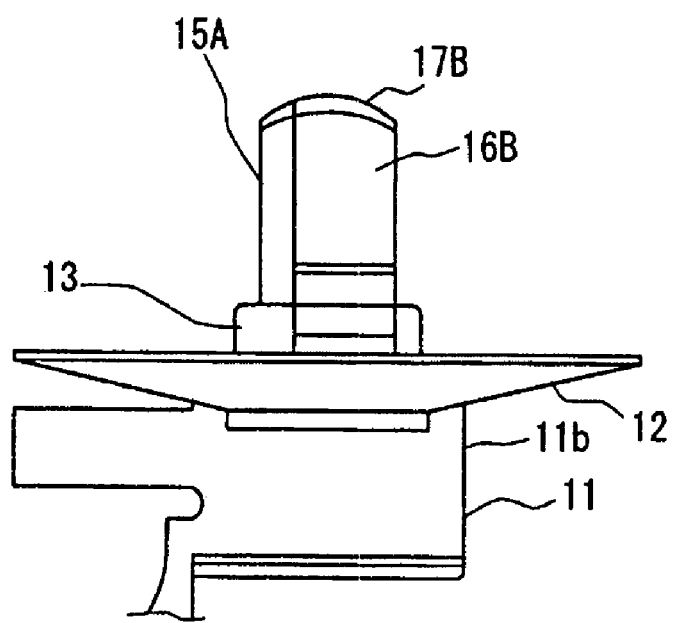
FIG. 4 is a right-hand side view of the clamp for use in the wire harness.

A first embodiment of a clamp in accordance with the invention is identified generally by the numeral 10 in FIGS. 1 through 7. The clamp 10 is intended for use in a wire harness W/H and is molded of a resin. The clamp 10 is mounted on the wire harness W/H wired on a vehicle body and is locked to a locking hole 30a formed on a vehicle body 30 to mount the wire harness W/H on the vehicle body 30. The clamp 10 of the first embodiment is of a band type.

The clamp 10 has a wire harness-mounting part 11 that can be fixed to the wire harness W/H. The wire harness-mounting part 11 has a box-shaped band-tightening portion 11a and a band 11b that extends from the band-tightening portion 11a. A plate 12 projects from the band-tightening portion 11a of the wire harness-mounting part 11. Left and right stems 15A, 15B project from a central portion of the plate 12 and a thin spanning part 14 connects confronting portions of the tips of the stems 15A, 15B. Thick vane supports 17A, 17B project away from one another from opposite left and right ends of the spanning part 14 and at the tips of the respective left and right stems 15A, 15B. Left and right vanes 16A, 16B project obliquely out and back towards the plate 12 from outer tips of the respective thick vane supports 17A, 17B and a pedestal 13 is provided on the left and right stems 15A, 15B on surfaces thereof opposite to the surfaces thereof confronting each other.

The band 11b of the wire harness-mounting part 11 is wound around the wire harness W/H and is inserted into a though-hole of the band-tightening portion 11a. A locking piece projects in the through-hole and is locked to a claw of the band 11b.

A vehicle body-locking part 16a is formed at the tip of each vane 16 and has three steps. An appropriate step of the vehicle body-locking part 16a is locked to the periphery of the locking hole 30a of the vehicle body 30 according to the size of the locking hole 30a and fixes the wire harness W/H to the vehicle body 30.

The two stems 15A, 15B are shifted longitudinally with a space provided there between in such a way that the stems 15A, 15B are symmetrical with respect to a central point A of the clamp 10. The central point A is the central point of the plate 12.

The two stems 15A, 15B are thinner than conventional stems and as thin as the spanning part 14. The thicknesses of the stems 15A, 15B and the spanning part 14 are sufficiently small to permit the stems 15A, 15B and the spanning part 14 to flex.

A cavity 18 is surrounded by the left and right stems 15A, 15B, the spanning part 14, and the plate 12.

The thick vane supports 17A, 17B are thicker than the spanning part 14 and project stepwise from the left and right ends of the spanning part 14.

Inner surfaces of the left and right vanes 16 and outer surfaces of the pedestal 13 are proximate and opposed to each other.

The clamp 10 is locked to the wire harness W/H by winding the band 11b around the peripheral surface of the wire harness W/H and inserting the tip of the band 11b into the band-tightening portion 11a.

Figure 5A:
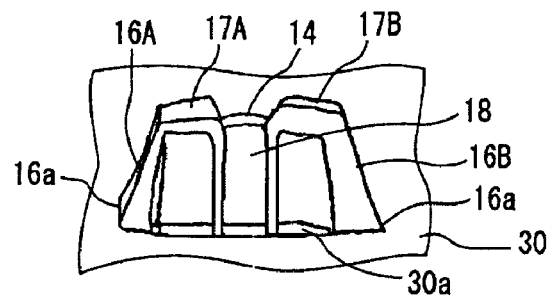
FIG. 5 is a front view for explaining the removal of the clamp for use in the wire harness from a vehicle body.
Figure 6A:
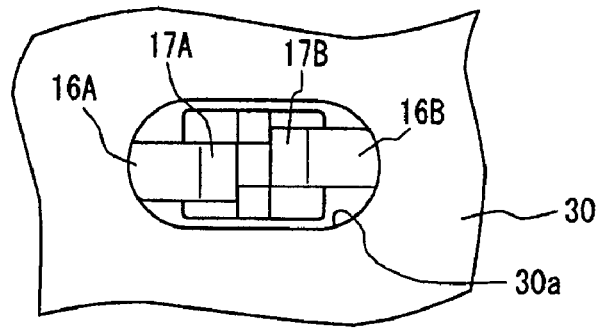
FIG. 6 is a plan view for explaining the removal of the clamp for use in the wire harness from the vehicle body.

The stems 15A, 15B, the thick vane supports 17A, 17B and the vanes 16A, 16B are pushed into the locking hole 30a of the vehicle body 30 to mount the wire harness W/H on the vehicle body 30. Forces between the vehicle body 30 and the clamp 10 cause the left and right vanes 16A, 16B to flex towards the stem 15 as the vanes 16A, 16B are pressed into the locking hole 30a. The left and right vanes 16A, 16B elastically return to their original states when the vanes 16A, 16B pass completely into the locking hole 30a. As a result, the steps of the left and right vehicle body-locking parts 16a are locked to the periphery of the locking hole 30a at the back side of the vehicle body 30. Thus, as shown in FIGS. 5A and 6A, the clamp 10 fixes the wire harness W/H to the vehicle body 30.

It may be necessary to re-wire the wire harness W/H in a manufacturing process, to replace the wire harness W/H during use or to recycle or discard the wire harness W/H when a vehicle body is disassembled. As a result, it is necessary to unlock the wire harness W/H from the clamp 10 to remove the wire harness W/H from the vehicle body 30. FIGS. 5 through 7 illustrate a method of unlocking wire harness W/H from the clamp 10.

Figure 5B:
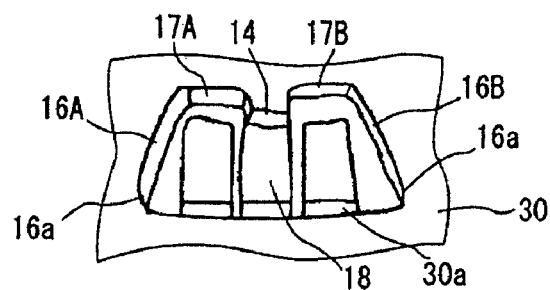
Figure 5C:
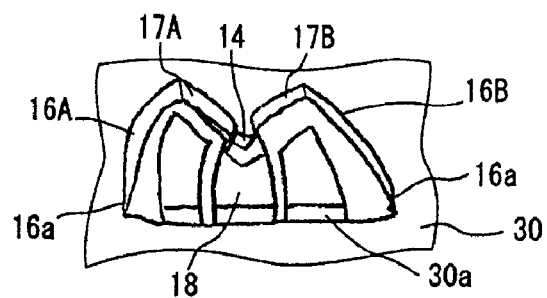
Figure 6B:
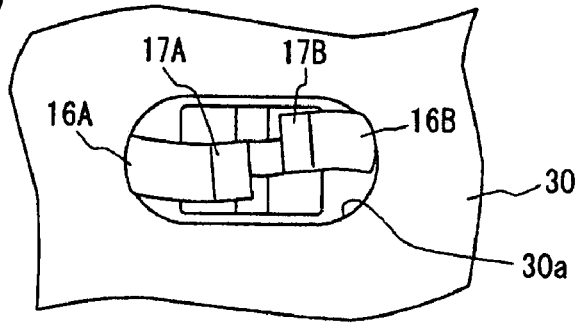
Figure 7A:
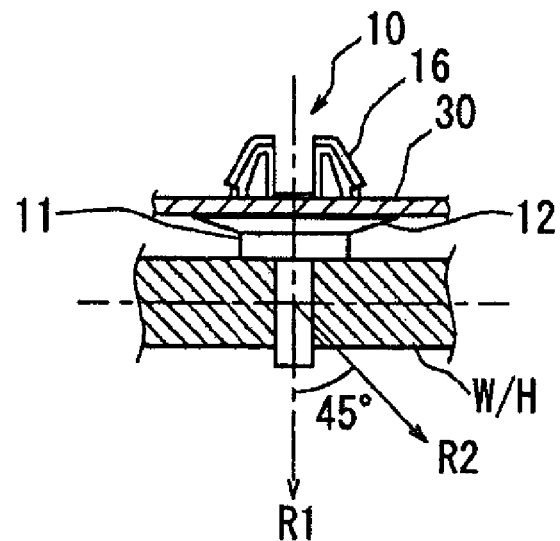
FIG. 7 shows a flexing direction of a vane part.

Initially the wire harness W/H is pulled with a strong force in a direction for removing the wire harness W/H from the vehicle body 30. As shown in FIGS. 5B and 6B, the pulling force causes the stems 15A, 15B and the spanning part 14 to flex into the cavity 18. The thick vane supports 17A, 17B and the spanning part 14 are stepped from each other so that the spanning part 14 can flex easily into the cavity 18. More particularly, the wire harness W/H is pulled normal to the wire harness W/H in a removal direction R1 from the vehicle body 30, as shown in FIG. 7A. As a result, the vane 16 flexes in a direction R2 inclined at 45 degrees to the removal direction R1.

The left and right stems 15A, 15B, the left and right thick vane supports 17A, 17B connected with the left and right stems 15A, 15B, and the left and right vanes 16A, 16B are shifted respectively so that the left and right stems 15A, 15B, the left and right thick flat parts 17A, 17B and the left and right vanes 16A, 16B are symmetrical with respect to the central point A of the clamp 10. Thus, when the wire harness W/H is pulled, a torsional rotation about the central point A is induced with the left stem 15A, the left thick vane support 17A, and the left vane 16A integral with each other, and with the right stem 15B, the right vane support 17B, and the right vane 16B integral with each other.

Figure 6C:
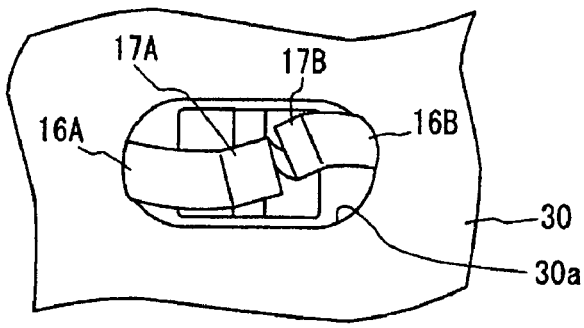
Figure 7B:
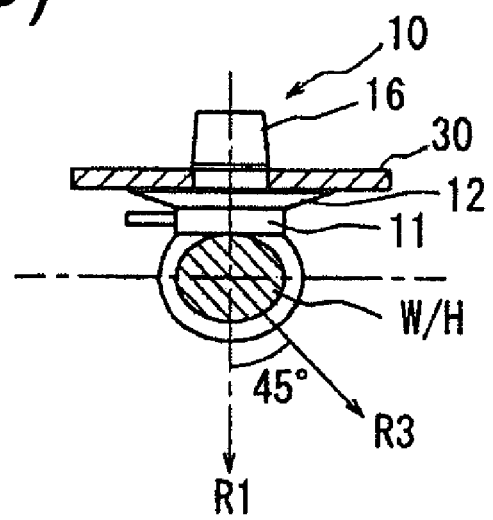

That is, as shown in FIG. 7B, the left and right vanes 16A, 16B are subjected to a pulling force in a direction R3 inclined at 45 degrees to the direction R1 that is normal to the longitudinal direction of the wire harness W/H. As a result, as shown in FIG. 6C, the vane 16B twists in a direction in which the vane 16B is located behind the vane 16A.

Figure 5D:
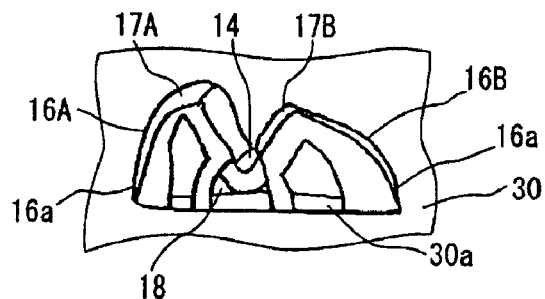
Figure 6D:
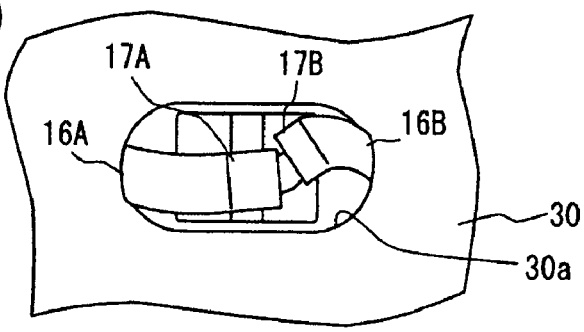

The wire harness W/H is pulled with a strong force in the removal direction R1, as shown in FIGS. 5D and 6D. As a result, the spanning part 14 and stems 15A, 15B flex in the direction in which the wire harness W/H is removed from the vehicle body 30, and the twisting of the left and right thick vane supports 17A, 17B and twisting of the left and right vanes 16A, 16B progress. Thus, the wire harness W/H is unlocked from the vehicle body-locking part 16a and can be removed from the vehicle body 30.

In the above-described construction, merely pulling the wire harness W/H in the removal direction from the vehicle body 30 causes the spanning part 14 and the left and right stems 15A, 15B to flex in the removal direction towards the cavity 18. Additionally, the thick vane supports 17A, 17B and the vanes 16A, 16B flex while they torsionally rotate. Therefore it is possible to decrease the pulling force.

On the other hand, when the clamp normally is locked to the vehicle body, an appropriate step of the multi-step vehicle body-locking part 16a of each of the left and right vanes 16A, 16B is locked to the locking hole 30a according to the diameter of the locking hole 30a. Further the plate 12 is pressed against the surface of the vehicle body 30. Therefore the clamp 10 can be fixed reliably to the vehicle body 30.

Figure 8:
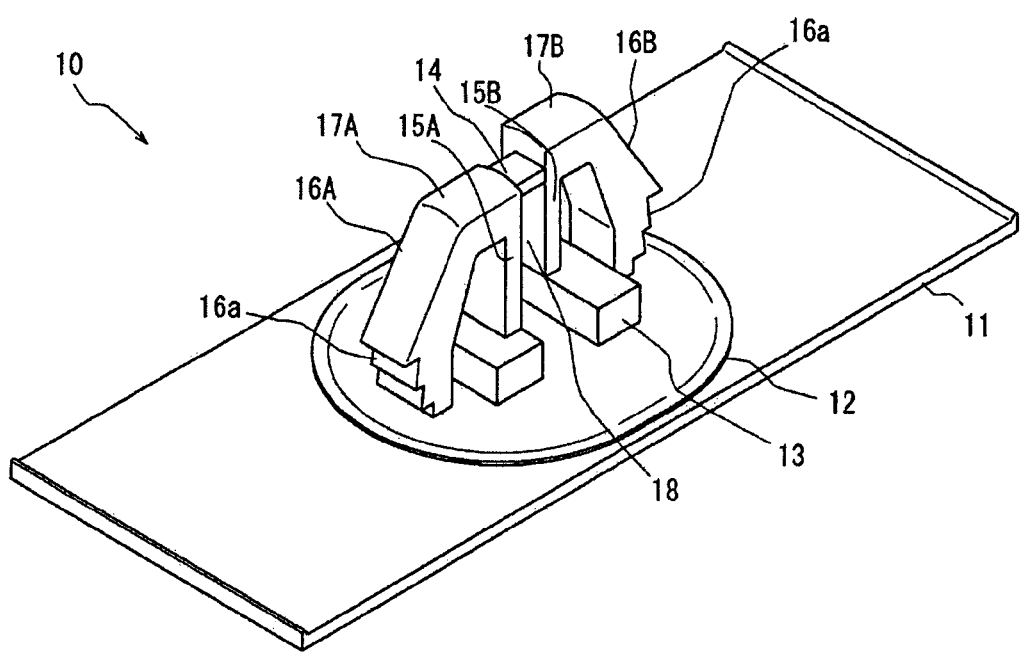
FIG. 8 is a perspective view showing a modification of the first embodiment.

FIG. 8 shows a modification of the first embodiment in that the clamp 10A is a substrate-type clamp. The clamp 10A has a rectangular wire harness-mounting part 11A that is secured to the wire harness W/H with a tape. Other constructions of the modification and the operation and effect thereof are similar to those of the first embodiment. Thus, parts of the modification that are the same as those of the first embodiment are denoted by the same reference numerals, but are not described again.

Figure 9:
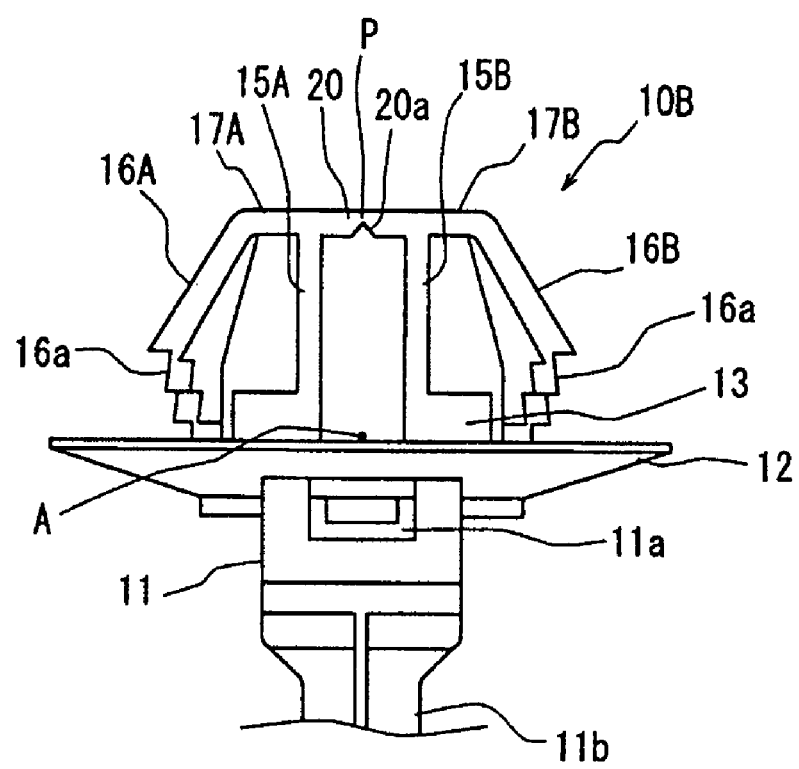
FIG. 9 is a perspective view showing a clamp for use in a wire harness of a second embodiment of the present invention.

FIGS. 9 and 10 show a clamp 10B according to a second embodiment of the invention. The clamp 10B has a spanning part 20 that connects opposed portions of the tips of the stems 15A, 15B to each other. The spanning part 20 also projects in a separation direction and has a groove 20a at the center that functions as the support for twist. Left and right vanes 16A, 16B project obliquely down and out from left and right ends of the spanning part 20. The clamp 10B of the second embodiment does not have the thick vane support 17 or the thin spanning part 14 of the first embodiment, but rather has the spanning part 20 of uniform thickness with the vane supports 17A, 17B and the groove 20a as the support for twist disposed at the center of the spanning part 20. Further the groove 20a is opposed to the plate 12 and aligns with the central point A of the clamp 10B.

The groove 20a on the connecting part 20 is V-shaped and has a depth ½ of about the thickness of the spanning part 20.

The above-described constructions are different from the construction of the first embodiment. Because other constructions of the second embodiment are similar to those of the first embodiment, parts of the second embodiment that are the same as those of the first embodiment are denoted by the same reference numerals, but are not described again.

The groove 20a may be broken when the spanning part 20 twists greatly. When the groove 20a is broken, the clamp 10B cannot be re-utilized. However, the clamp 10B can be unlocked easily from the vehicle body.

Figure 10A:
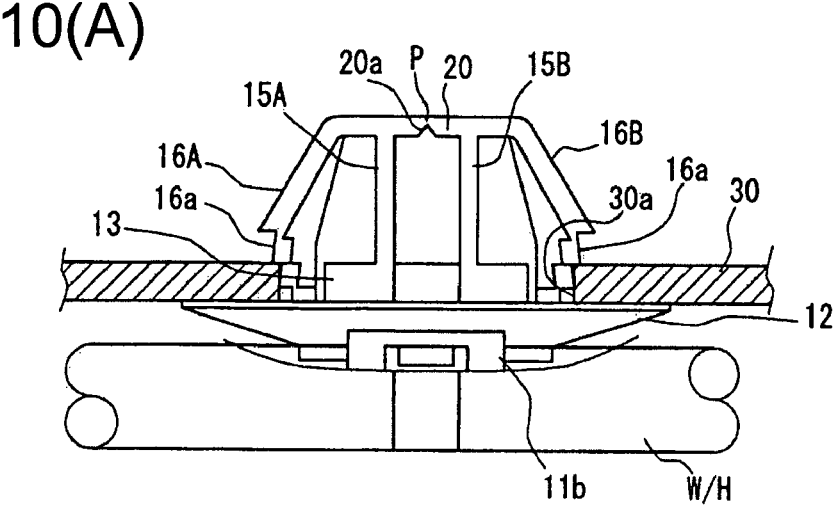
FIG. 10 explains the method of removing the clamp for use in the wire harness from a vehicle body.
Figure 10B:
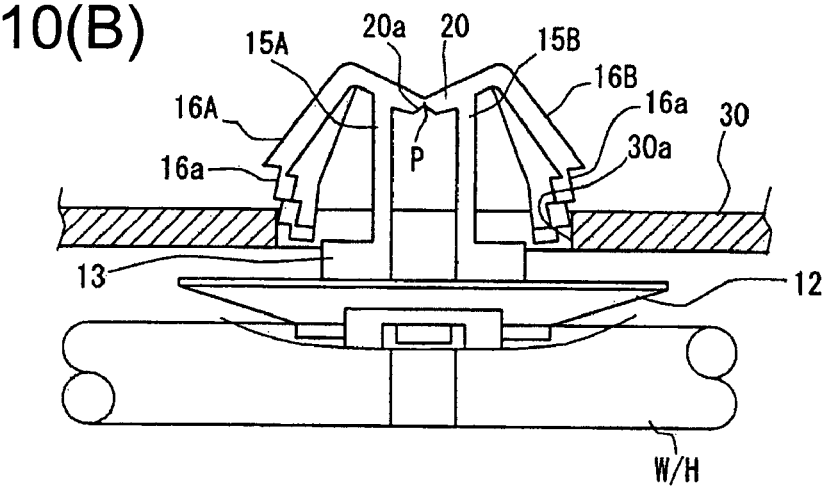

The second embodiment enables the wire harness W/H to be removed from the mounted condition on the vehicle body 30 shown in FIG. 10A by pulling the wire harness W/H strongly in the removal direction. As shown in FIG. 10B, the pulling force applied to the wire harness W/H, with concentrates stress on the V-shaped groove 20a. Thus, the left and right stems 15A, 15B and the left and right vanes 16A, 16B flex towards the cavity and about the groove 20a serving as a torsional rotation support P.

The left and right stems 15A, 15B are symmetrical with respect to the central point A of the clamp 10B. Thus, when the wire harness W/H is pulled farther, a torsional rotation about the torsional rotation point P is induced with the left stem 15A and the left vane 16A integral with each other, and with the right stem 15B and the right vane 16B integral with each other.

The vehicle body-locking part 16a of the vane 16 is unlocked from the left and right peripheral edges of the locking hole 30a with further progress of the torsional rotation.

Figure 10C:
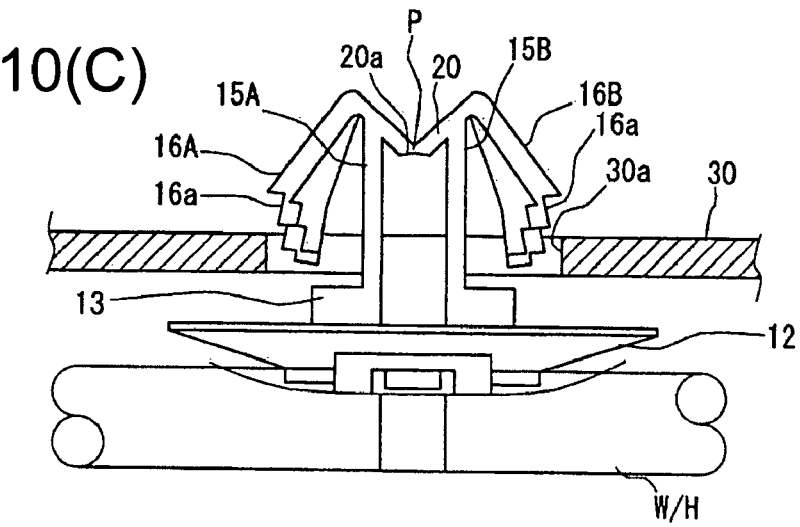

The left and right vanes 16A, 16B incline further and are pulled out of the locking hole 30a when the wire harness W/H is pulled further, as shown in FIG. 10C. Therefore it is possible to completely pull the clamp 10B out of the locking hole 30a and remove the wire harness W/H from the vehicle body 30.

The substrate-type clamp may be used in the second embodiment.

Figure 11:
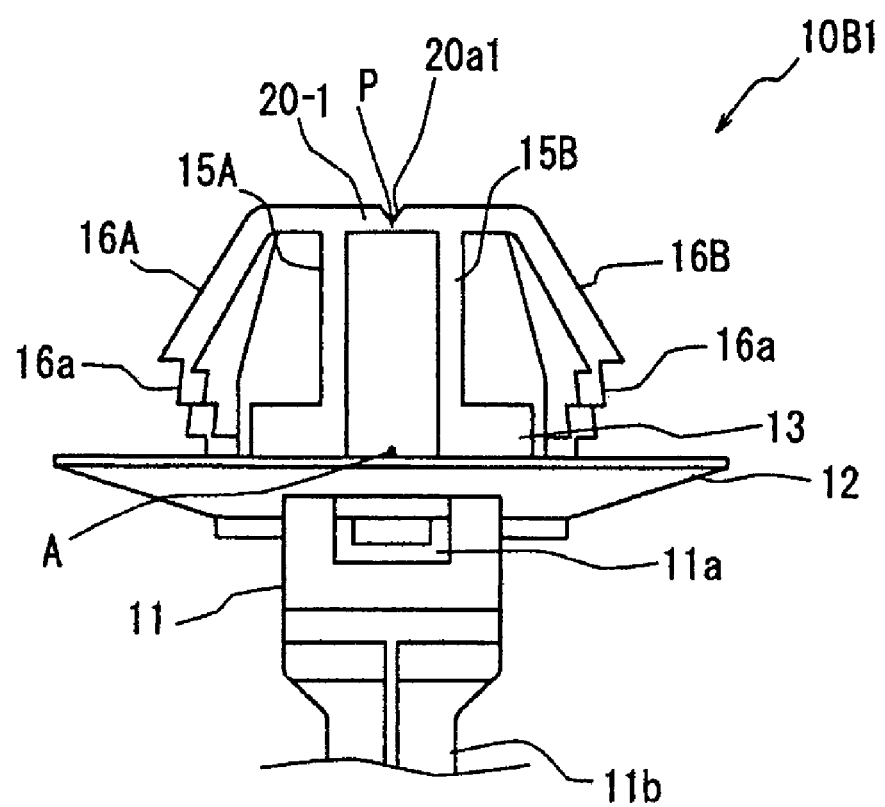
FIG. 11 is a perspective view showing a modification of the second embodiment.

FIG. 11 shows a clamp 10B1 as a modification of the second embodiment. The modification is different from the second embodiment in that the groove 20a1 that functions as the support for twist is formed at a central portion of a surface of the spanning part 20-1 that faces away from to the plate 12.

In the above-described construction, stress concentrates on the V-shaped groove 20a1 when removing the wire harness W/H from the vehicle body 30 to which the wire harness W/H, and the left and right vanes 16A, 16B incline. Thus, the vehicle body-locking part 16a can be unlocked from the locking hole and the wire harness W/H can be removed completely from the vehicle body 30.

Other parts of the modification are substantially the same as those of the second embodiment. Accordingly, those parts are identified by the same reference numerals as in the description of the second embodiment, but are not described again.

Figure 12:
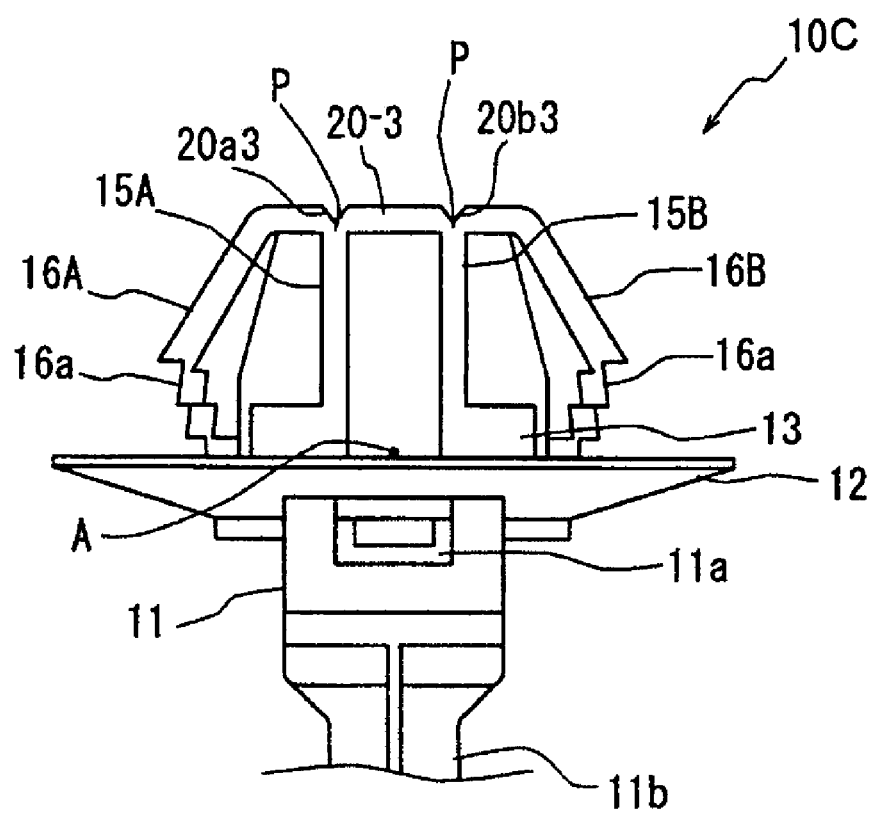
FIG. 12 is a perspective view showing a clamp for use in a wire harness of a third embodiment of the present invention.

FIGS. 12 and 13 show a clamp 10C according to a third embodiment. The spanning part 20-3 does not have a groove at the center to support twist, but rather has grooves 20a3, 20b3 as the supports for twist at positions corresponding to the tips of the left and right stems 15A, 15B.

The third embodiment is different from the second embodiment in the above-described construction, but other constructions of the third embodiment are similar to those of the second embodiment.

Figure 13A:
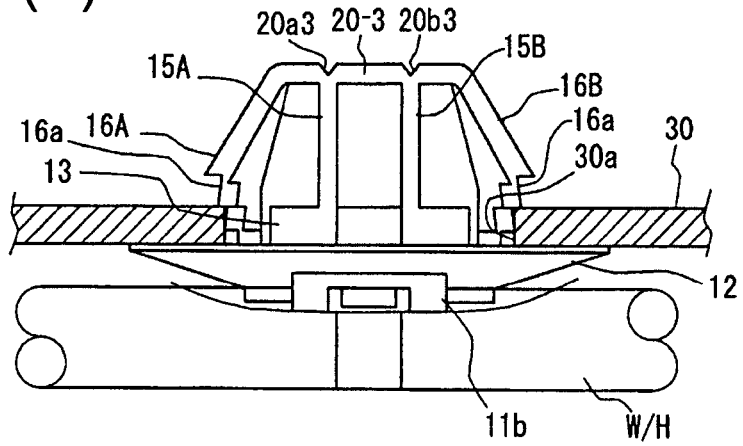
FIG. 13 explains the method of removing the clamp for use in the wire harness from a vehicle body.
Figure 13B:
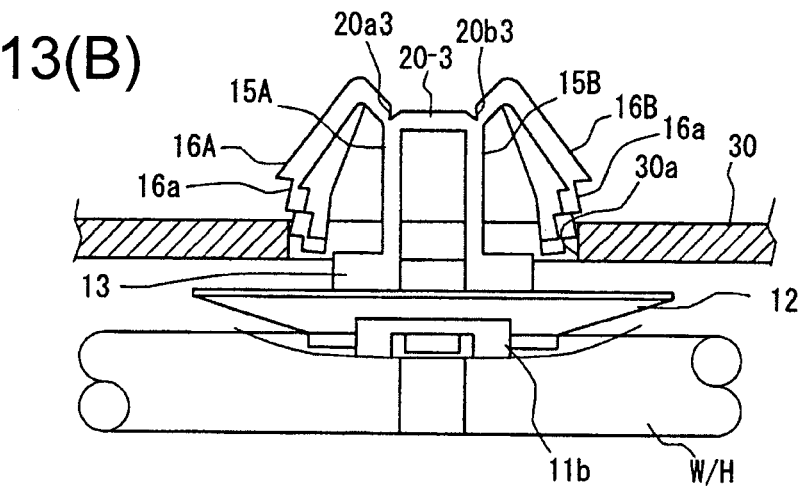
Figure 13C:
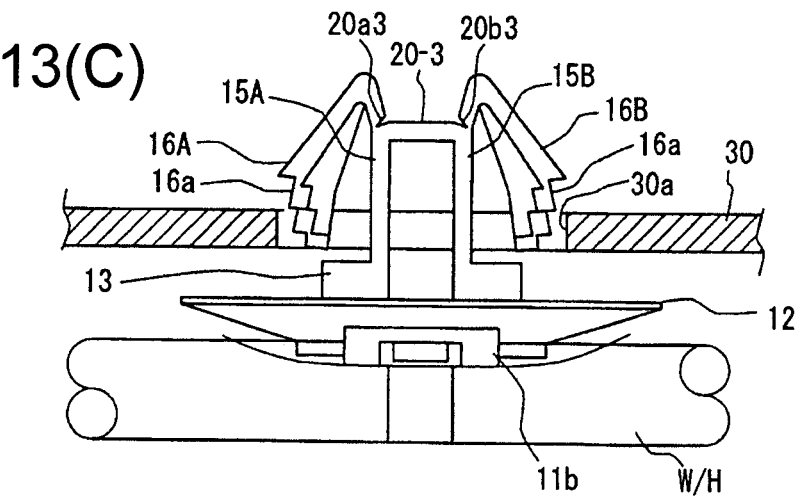

In the above-described construction, in removing the wire harness W/H from to which the wire harness W/H is fixed the vehicle body 30 by the clamp 10C, as shown in FIG. 13A. The wire harness W/H can be removed from the vehicle body 30 by pulling the wire harness away from the vehicle body, as in the other embodiments. Thus, as shown in FIG. 13B stress concentrates on the V-shaped grooves 20a3, 20b3, and the left and right vanes 16A, 16B incline and flex with the grooves 20a3, 20b3 serving as supports for twist and serving as a torsional rotation supports P. Accordingly, a torsional rotation of the vanes 16A, 16B about the grooves 20a3, 20b3 is induced. When the wire harness W/H is pulled further in the removal direction, as shown in FIG. 13C, the stepped vehicle body-locking part 16a is unlocked from the locking hole, and the wire harness W/H can be removed from the vehicle body 30.

The grooves 20a3, 20b3 enable the left and right vanes 16A, 16B to flex easily towards the left and right stems 15A, 15B. Thus, a lower insertion force is required to lock the clamp 10C and the wire harness W/H to the vehicle body 30, thereby easing the work for the operator.

Other parts of the third embodiment are similar to those of the second embodiment. Parts of the third embodiment that are similar to the second embodiment are denoted by the same reference numerals as in the second embodiment, but are not described again.

Figure 14:
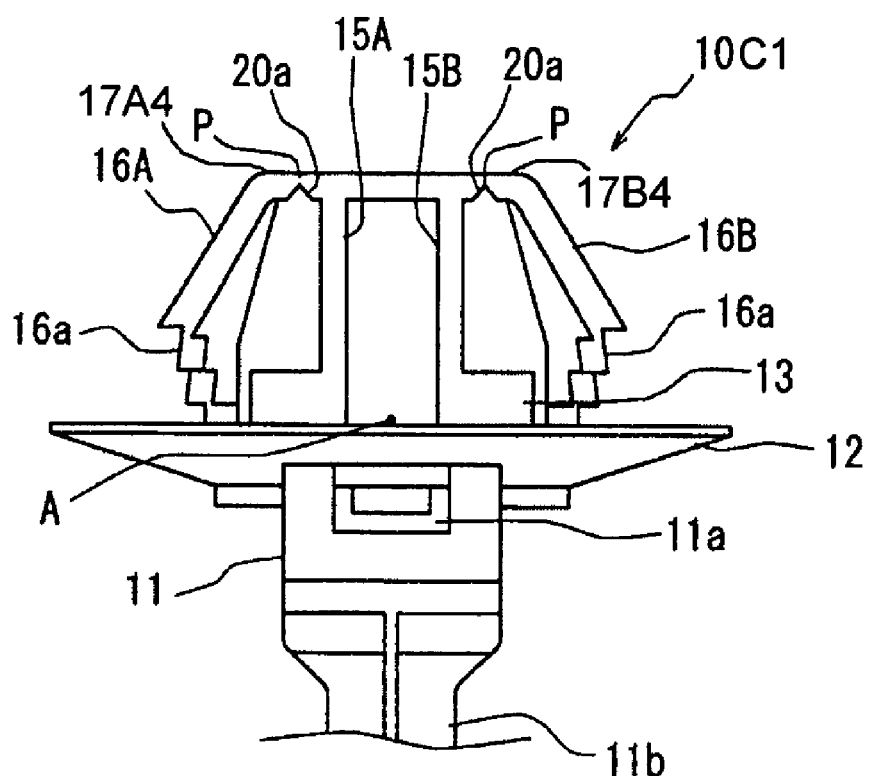
FIG. 14 is a perspective view showing a modification of the third embodiment.
Figure 15:
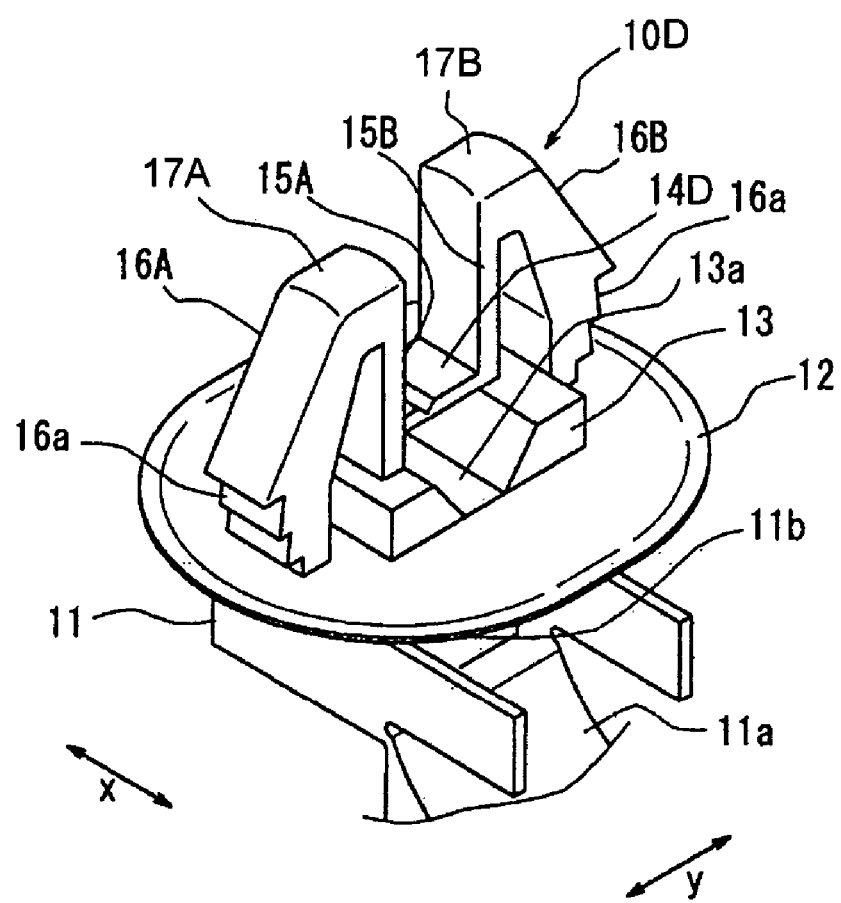
FIG. 15 is a perspective view showing a clamp, for use in a wire harness, of a fourth embodiment of the present invention.
Figure 16:
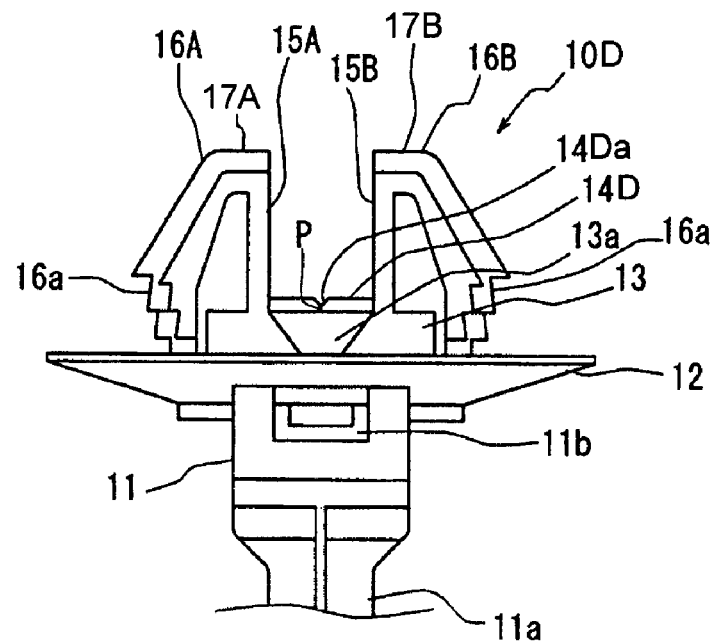
FIG. 16 is a front view of the clamp of the fourth embodiment.
Figure 17:
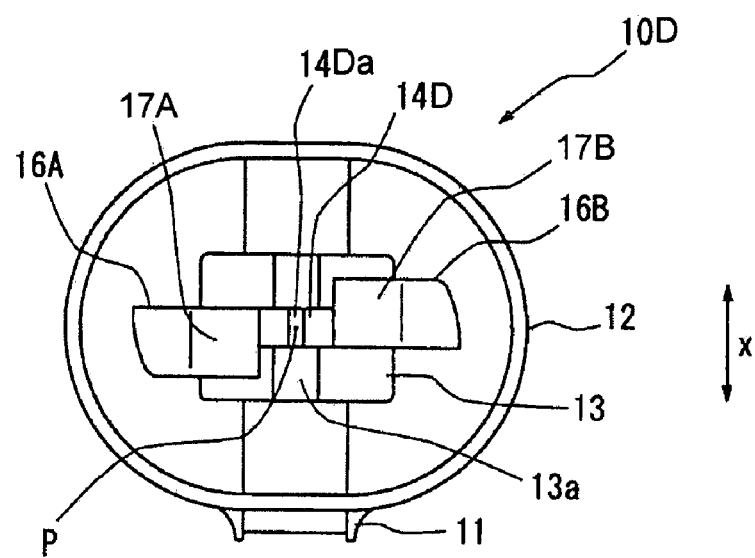
FIG. 17 is a plan view of the clamp of the fourth embodiment.
Figure 18:
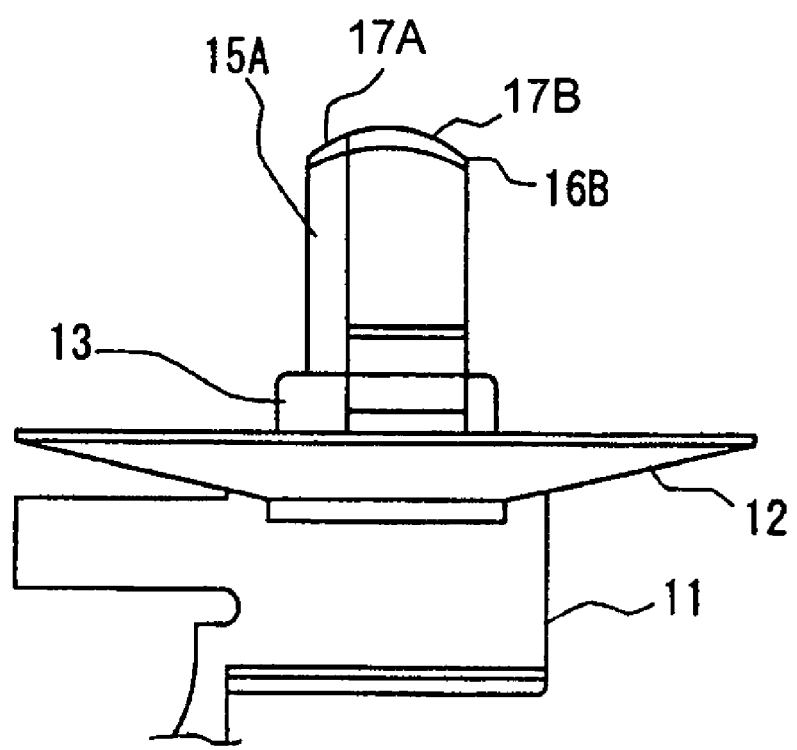
FIG. 18 is a right-hand side view of the clamp of the fourth embodiment.

FIG. 14 is a clamp 10C1 that is a modification of the third embodiment. The modification is different from the third embodiment in that the grooves 20a4, 20b4 are disposed on an inner surface of the vane supports 17A4, 17B4 opposed to the plate 12 and at positions between the left and right stems 15A, 15B and the vanes 16A, 16B.

Other parts of the modification are similar to the third embodiment. Parts of the modification that are similar to the third embodiment are denoted by the same reference numerals as in the third embodiment, but are not described again.

FIGS. 15 through 21 show a clamp 10D in accordance with a fourth embodiment of the invention. The clamp 10D has a wire harness-mounting part 11 as in the first embodiment and a plate 12 projects from a band-tightening portion 11a of the wire harness-mounting part 11. A pedestal 13 projects from a surface of the plate 12 opposite the wire harness-mounting part 11. An inverse trapezoidal groove 13a is formed at a central portion of the pedestal 13. A spanning part 14D spans over the groove 13a of the pedestal 13. Left and right stems 15A, 15B are connected to opposite ends of the spanning part 14D in a left-to-right direction y and project from the pedestal 13 in a direction away from the plate 12. Left and right vane supports 17A, 17B extend away from each other at the ends of the stems 15A, 15B and left and right vanes 16A, 16B turn back from leading ends of the vane supports 17A, 17B obliquely towards the plate 12. The vanes 16A, 16B diverge from one another at positions closer to the plate 12 and have substantially symmetrical configurations.

A V-shaped groove 14Da is formed at the center of the spanning part 14D connecting the stems 15A, 15B and guides the torsional rotation of the left and right vanes 16A, 16B. The apex of the groove 14a serves as the support for twist and defines a torsional rotation support P. The torsional rotation support P is located at the central point of the clamp 10D.

The stems 15A, 15B are symmetrical with respect to a central point A of the elliptic plate 12 and are shifted longitudinally from each other in a longitudinal direction x to project them from the pedestal 13.

The left and right vane supports 17A, 17B are continuous with the tips of the left and right stems 15A, 15B respectively and the vanes 16A, 16B are continuous with the vane supports 17A, 17B. The thicknesses of the vane supports 17A, 17B and the stems 15A, 15B are substantially equal to each other and small so that the vane supports 17A, 17B and the stems 15A, 15B are flexible.

Figure 19A:
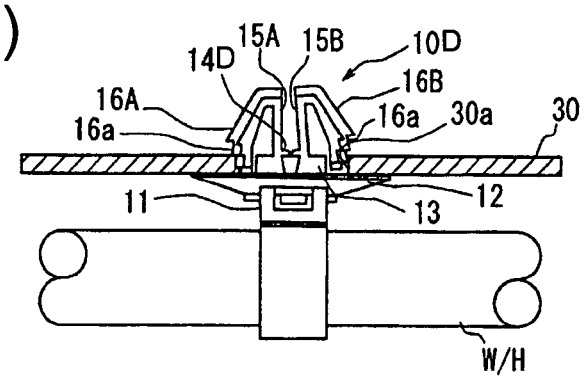
FIGS. 19A-D are front views for explaining the removal of the clamp of the fourth embodiment from a vehicle body.
Figure 19B:
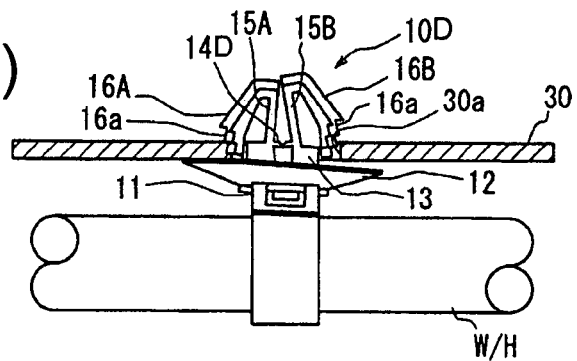
Figure 19C:
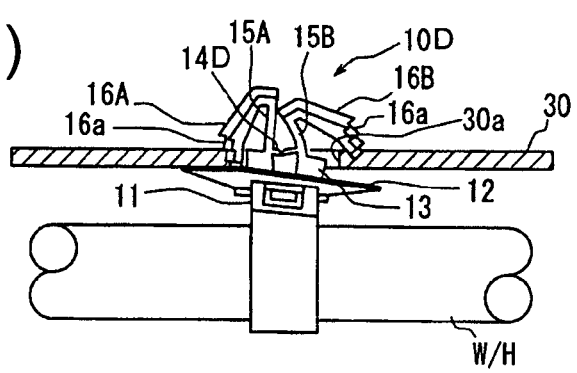
Figure 20A:
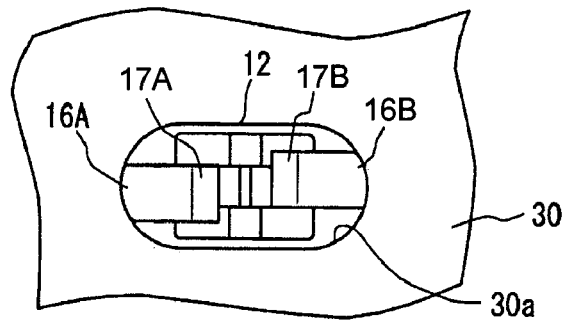
FIGS. 20A-D are plan views for explaining the removal of the clamp of the fourth embodiment from the vehicle body.
Figure 20B:
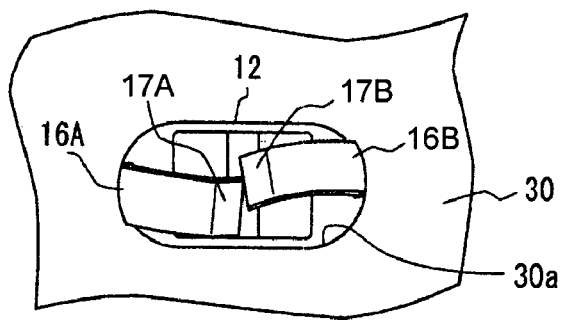

The stems 15A and 15B and the vanes 16A, 16B are inserted into the locking hole 30a of the vehicle body 30, as in the first embodiment. More particularly, the left and right vanes 16A, 16B are pressed into the locking hole 30a by flexing the vanes 16A, 16B towards the stems 15A and 15B. The left and right vanes 16a, 16B elastically return to their original state when the vanes 16A, 16B are pressed completely into the locking hole 30a. As a result, the vehicle body-locking stepped parts 16a at the tip of the each of the left and right vanes 16A, 16B lock to the periphery of the locking hole 30a at the back side of the vehicle body 30. Thus, as shown in FIGS. 19A and 20A, the wire harness W/H is fixed to the vehicle body 30 through the clamp 10D.

FIGS. 19 through 21 show steps of removing the wire harness W/H from the vehicle body. Initially the wire harness W/H is pulled at a strong force in a direction in which the wire harness W/H is removed from the vehicle body 30, as in the first embodiment. As shown in FIGS. 19B and 20B, the spanning part 14D flexes about the groove 14a, and the stems 15A, 15B and the vanes 16A, 16B flex towards the center of the clamp 10D about the groove 14a as the support for twist of the spanning part 14D serving as the torsional rotation support P.

Figure 21A:
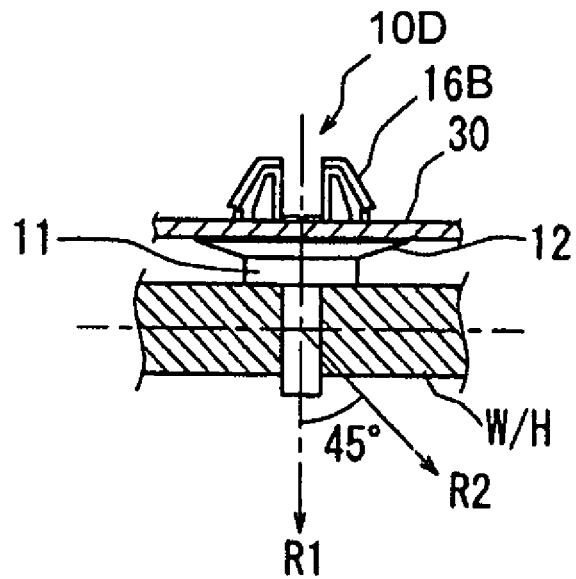
FIGS. 21A and 21B show a flexing direction of a vane of the fourth embodiment.

The wire harness W/H is pulled in a direction R1 in which the wire harness W/H is removed from the vehicle body 30, as shown in FIG. 21A. Thus, the vanes 16A, 16B flex in a direction R2 inclined at 45 degrees to the direction R1 normal to the longitudinal direction of the wire harness W/H.

The left and right stems 15A, 15B and the left and right vanes 16A, 16B project from the pedestal 13 symmetrically with respect to the central torsional rotation support P of the clamp 10D. Thus when the wire harness W/H is pulled, a torsional rotation about the torsional rotation support P is induced with the left stem 15A and the left vane 16A integral with each other, and with the right stem 15B and the right part 16B integral with each other.

Figure 19D:
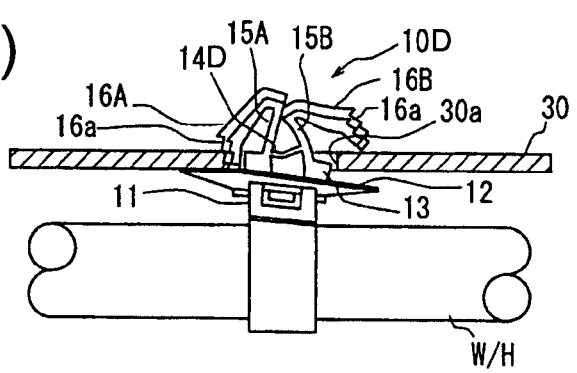
Figure 20C:
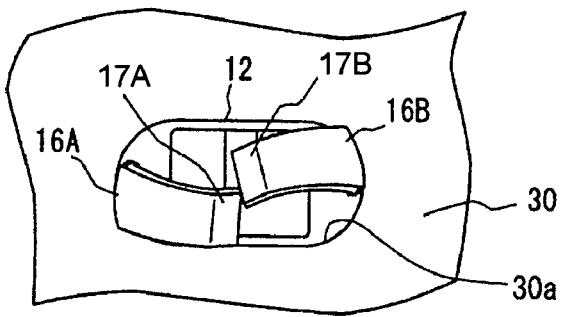
Figure 20D:
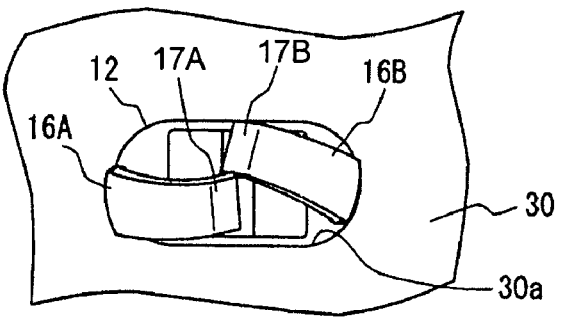
Figure 21B:
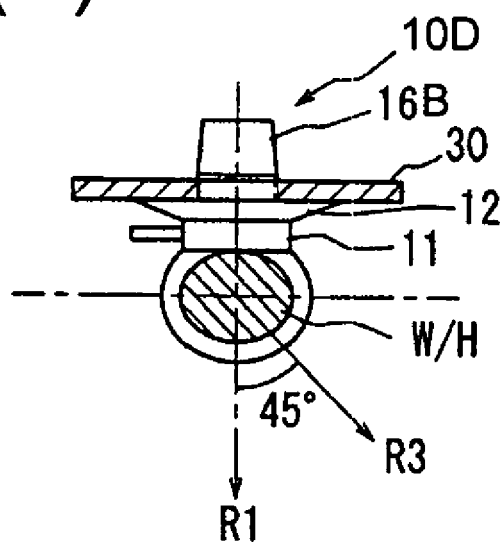

That is, by pulling the wire harness W/H in the direction R1 shown in FIG. 21B, the vanes 16A, 16B are subjected to the pulling force in a direction R3 inclined at 45 degrees to the direction R1 normal to the longitudinal direction of the wire harness W/H. As a result, as shown in FIG. 20C, the vane support 17B of the vane 16B twists in a direction in which the vane 16B is located behind the vane 16A. As shown in FIG. 19D, when the vane support 17B of the vane 16B twists perpendicularly about the groove 14Da of the spanning part 14D in its original position, as shown in FIG. 20D, the vane support 17B of the vane 16B further twists and is located behind the vane 16A.

When this state is attained, the vehicle body-locking part 16a at the tip of each of the left and right vanes 16A, 16B is unlocked from the peripheral edge of the locking hole 30a.

By further pulling the wire harness W/H when the vehicle body-locking part 16a of each of the left and right vanes 16 is unlocked from the locking hole 30a, it is possible to pull out the left and right stems 15A, 15B and the left and right vanes 16A, 16B from the locking hole 30a to remove the wire harness W/H from the vehicle body 30.

Figure 22:
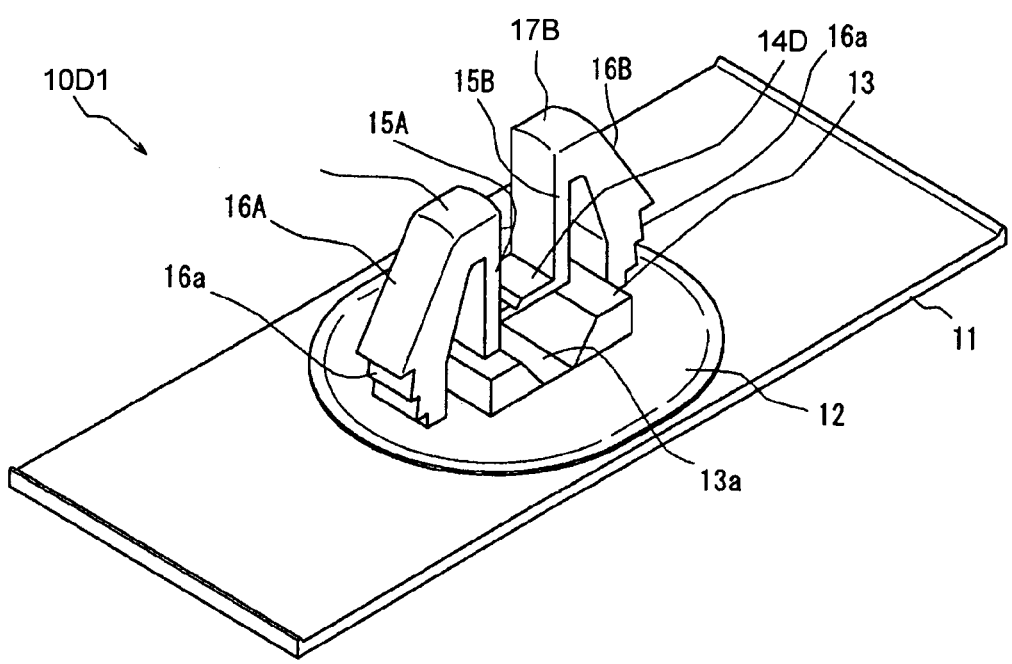
FIG. 22 is a perspective view showing a clamp, for use in a wire harness, of a fifth embodiment.
Figure 23A:
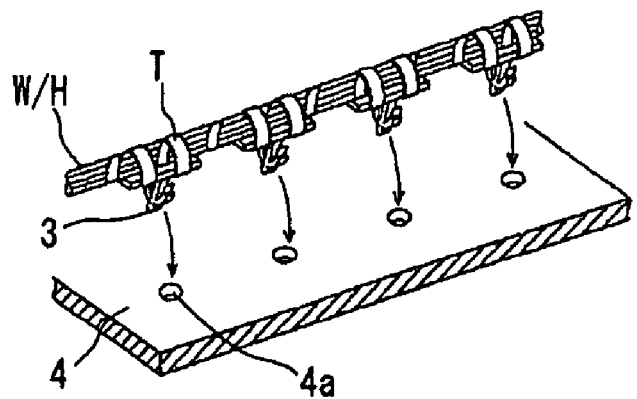
FIG. 23 shows a conventional art.
Figure 23B:
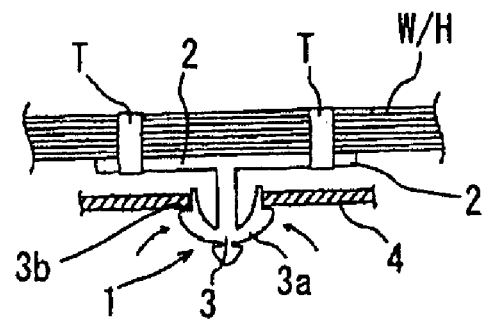
Figure 23C:
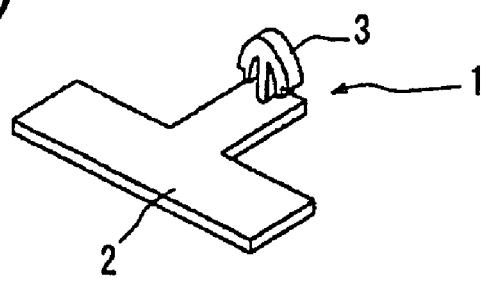
Figure 24:
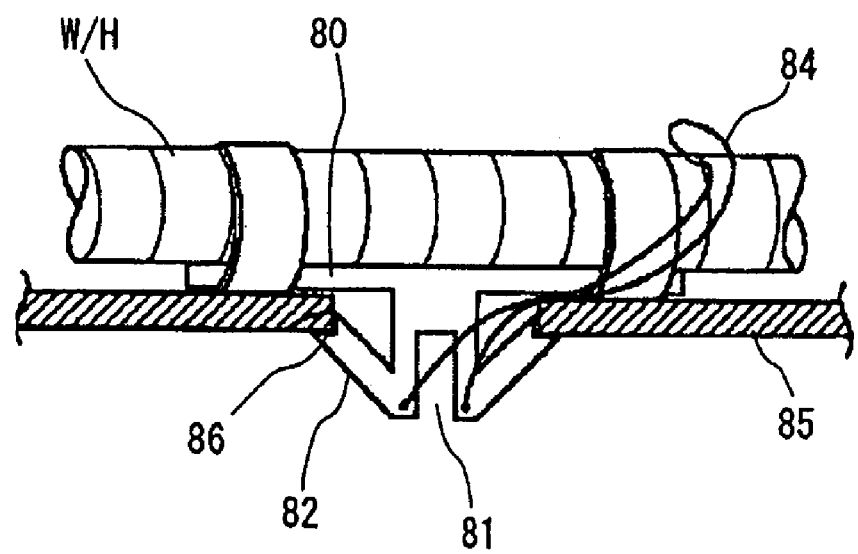
FIG. 24 shows another conventional art.

FIG. 22 shows a fifth embodiment of the invention. A clamp 10E of the fifth embodiment is of a substrate type. The clamp 10E has a rectangular wire harness-mounting part 11E, both sides of which are wound round the wire harness W/H with a tape. The above-described construction is different from the construction of the fourth embodiment. Because other constructions of the fifth embodiment are similar to those of the first embodiment, the same parts of the fifth embodiment as those of the fourth embodiment are denoted by the same reference numerals as those of the fourth embodiment, and description thereof is omitted herein.

What is claimed is:

1. A clamp for locking a wire harness to a locking hole in a vehicle body, comprising:

a harness-mounting part configured to be fastened to said wire harness;

a plate projecting from said harness-mounting part;

first and second spaced apart stems projecting from the plate, each of the stems having a stem width parallel to the plate and normal to a spacing between the stems and a stem thickness normal to the plate and parallel to the spacing between the stems;

a spanning part connecting confronting portions of said stems, the spanning part having an inner surface facing the plate, an outer surface focusing away from the plate and a spanning part thickness between the inner and outer surfaces, the spanning part further having a spanning part width parallel to the stem width, the spanning part width being smaller than the stem width;

first and second vane supports projecting from tips of the stems and extending away from one another, each of the first and second vane supports having an inner surface facing the plate, an outer surface facing away from the plate, and a vane support thickness therebetween the inner and outer surfaces, the vane support thickness being larger than both the stem thickness and the spanning part thickness;

first and second vanes projecting respectively from the first and second vane supports obliquely towards the plate, a vehicle body-locking part formed at a tip of each of the vanes; and whereby formation of the spanning part with a spanning part thickness less than the vane support thickness generates twisting of the vanes in response to a pulling force on said clamp away from the vehicle body to unlock said vehicle body-locking parts of said vanes from said locking hole.

2. The clamp (10) of claim 1, wherein the means for generating twisting comprises at least one groove (20a) formed in the tip-spanning part (20).

3. The clamp (10) of claim 2, wherein the groove (20a) is on a side of the tip-spanning part (20) facing the plate (12).

4. The clamp (10) of claim 2, wherein the groove (20a) is on a side of the tip-spanning part (20) facing away from the plate (12).

5. The clamp (10) of claim 2, wherein the at least one groove (20a) comprises a plurality of grooves (20a).

6. The clamp (10) of claim 1, wherein the spanning part (14) connects ends of the stems (15A, 15B) remote from the plate (12).

7. The clamp (10) of claim 2, wherein the spanning part (14) connects parts of the stems (15A, 15B) in proximity to the plate (12).

8. The clamp (10) of claim 1, wherein the means for generating twisting comprises at least one groove (20a) formed in each of the vane supports (17A, 17B).

9. The clamp (10) of claim 1, wherein the means for generating twisting comprises at least one groove (20a) formed in a projecting end of each of the stems (15A, 15B).

10. A of clamp, for locking a wire harness to a locking hole in a vehicle body, comprising:
   a harness-mounting part configured to be fastened to said wire harness;
   a plate projecting from said harness-mounting part;
   first and second spaced apart stems projecting from the plate, each of the stems having a stem width parallel to the plate and normal to a spacing between the stems and a stem thickness parallel to the plate and parallel to the spacing between the stems;
   a spanning part connecting confronting portions of said stems, the spanning part having an inner surface facing the plate, an outer surface facing away from the plate and a spanning part thickness between said inner and outer surfaces, the spanning part further having a spanning part width parallel to the stem width, the spanning part width being smaller than the stem width;
   first and second vane supports projecting from tips of the stems and extending away from one another, each of the first and second vane supports having an inner facing the plate, an outer surface facing away from the plate and a vane support thickness therebetween, the vane support thickness being larger than both the stem thickness and the spanning part thickness;
   first and second vanes projecting respectively from the first and second vane supports obliquely towards the plate, a vehicle body-locking part formed at a tip of each of the vanes; and
   the first stem, the first vane support and the first vane being in a first plane, and the second stem, the second vane support and the second vane being in a second plane substantially parallel to the first plane for generating twisting of the vanes in response to a pulling force on said clamp away from the vehicle body to unlock said vehicle-body locking parts of said vanes from said locking hole.

11. The clamp of claim 1, wherein said harness-mounting part comprises a band-tightening portion formed on the plate and a band projecting from the band-tightening portion, the band having a free end insertable into the band-tightening portion, and the band-tightening portion being configured to lock to portions of the band.

12. The clamp of claim 1, wherein said harness-mounting part comprises a substrate for taped engagement with the wire harness.

13. The clamp claim 1 formed unitarily of a synthetic resin.

14. The clamp of claim 1, wherein the stems have no connections at locations between the plate and the spanning part.

15. The clamp of claim 1, wherein the stem thickness is substantially equal to the spanning part thickness.

16. A clamp for locking a wire harness to a locking hole in a vehicle body, comprising:
   a harness-mounting part configured to be fastened to said wire harness;
   a plate projecting from said harness-mounting part;
   first and second spaced apart stems projecting from the plate;
   a spanning part connecting confronting portions of said stems at a position spaced from the plate so that no connection exists between the stems at all locations between the spanning part and the plate;
   first and second vane supports projecting from tips of the stems and extending away from one another;
   first and second vanes projecting respectively from the first and second vane supports obliquely towards the plate, a vehicle body-locking part formed at a tip of each of the vanes; and
   whereby absence of connections between the first and second stems at all locations between the spanning part and the plate enables twisting of the stems relative to the plate in response to a pulling force on said clamp away from the vehicle body to unlock said vehicle body-locking parts of said vanes from said locking hole.

* * * * *